March 17, 1936. J. P. TARBOX 2,034,275
SYSTEM OF CONTROL FOR ELECTRIC SPOT WELDING
Original Filed March 27, 1931
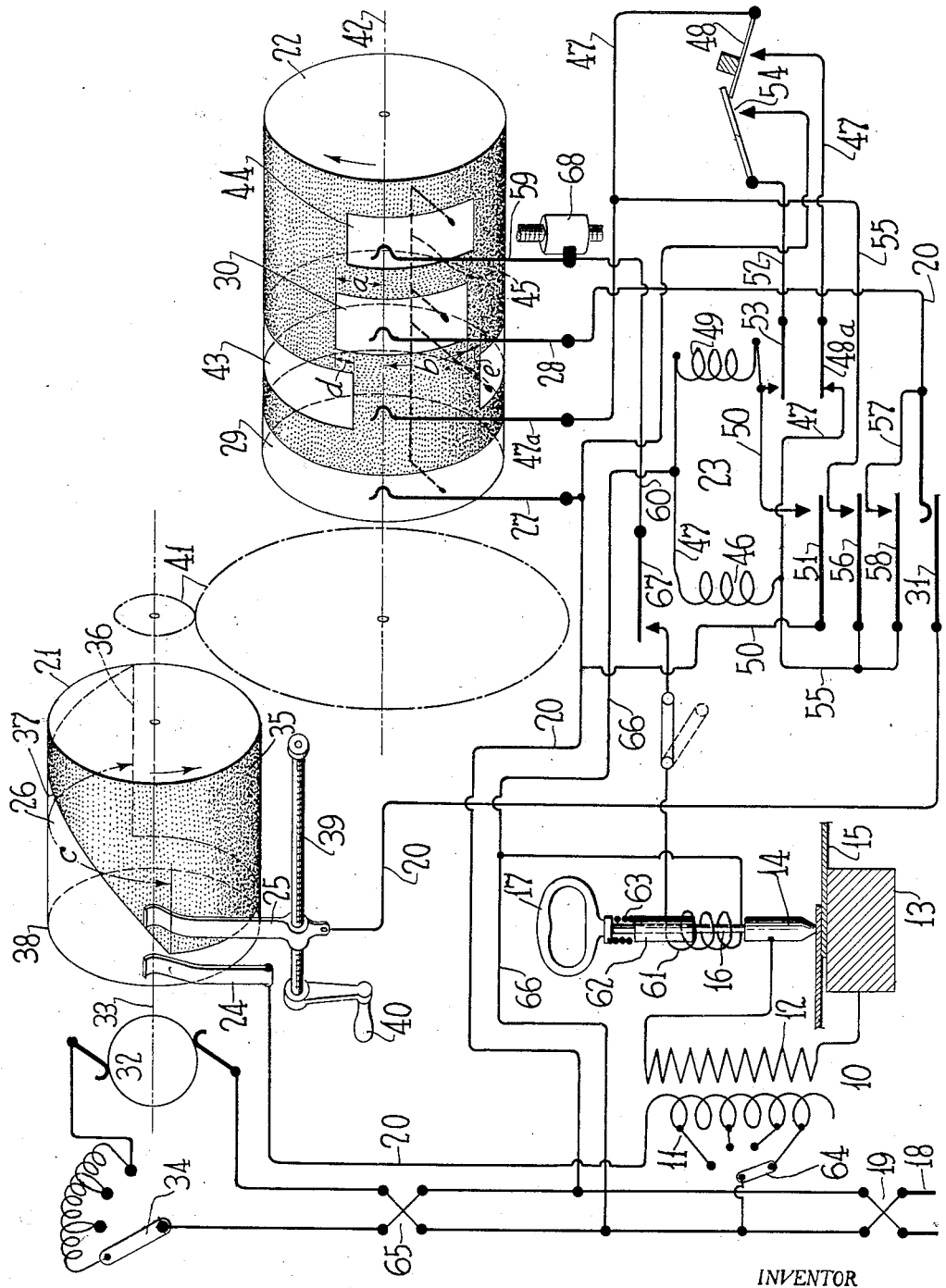
INVENTOR
J. P. Tarbox Patented Mar. 17, 1936

2,034,275

UNITED STATES PATENT OFFICE 2,034,275

SYSTEM OF CONTROL FOR ELECTRIC SPOT WELDING

John P. Tarbox, Philadelphia, Pa., assignor to Edward G. Budd Manufacturing Company, Philadelphia, Pa., a corporation of Pennsylvania Application March 27, 1931, Serial No. 525,674
Renewed September 21, 1933

24 Claims. (Cl. 219—4)

My invention relates to a method and system of control for electric circuits and more especially for spot welding devices having adaptation especially to extremely instantaneous welding. They are moreover particularly adapted for extremely instantaneous indirect welding, the term "indirect" here being applied to those welds in which action and reaction to the electrodes can not by reason of the construction of the work be absorbed fully within the welding apparatus as well as those welds in which for similar reasons the electrodes may not directly oppose each other on opposite faces of the work.

One object is the achievement of control through continuously rotating contact devices whereby mechanical and electrical inertias are wholly eliminated from influence upon the accuracy with which the extremely instantaneous time intervals are measured. Scarcely second in importance is the object of achieving indirect welding in instantaneous time intervals.

Viewed from the opposite side it may be said that one object of the invention is the elimination of the influence of mechanical and electrical inertia upon the accuracy of measurement of instantaneous time intervals for spot welds. From this angle the invention is attained by the employment of continuously rotating welding circuit control contacts. More specifically still it is attained by the employment of a pair of relatively high and low speed commutators having substantially commensurately proportioned welding circuit control contacts operating in series with each other and which commutators are geared together commensurately, and control enabling means for these commutators in the form of electro-magnetic switching devices manually or automatically governed through the low speed commutator and having but a single effective enabling operation per complete revolution of the low speed commutator.

One of the objects of the invention, the achievement of indirect instantaneous spot welding, is attained by utilizing welding electrodes in the manner of an anvil and hammer, the hammer blow of which develops the maximum welding pressure, and so co-ordinating or simulating synchronism between the hammer blow of the one electrode toward the other and the instantaneous application of welding current that the contact surfaces to be welded together are fused under those initial and final pressures, the latter of which are developed particularly by the hammer blow which will secure an efficient instantaneous weld. Such co-ordination and simulated synchronism are attained through simulated control of the hammer blow mechanism by the same continuously rotating timing apparatus through which the extreme instantaneous time periods are measured free of mechanical and electrical inertia.

The accompanying drawing discloses my invention diagrammatically, the single figure being the principal and complete diagrammatic illustration of the system and apparatus.

The welding circuits are derived from a transformer 10 having a primary 11 and a secondary 12. Connected with the opposite terminals of the secondary 12 are an anvil type electrode 13 and a hammer type electrode 14. The anvil type 13 is adapted for holding by an operator interiorly of the work 15 as, for example, interiorly of the hull of a flying boat to be made of metal, or interiorly of the body of another vessel. It is characteristic of such bodies that their outer covering is of such expansive and all inclusive nature that it becomes impracticable to effect mechanical interconnection for direct reaction between the inner electrode 13 and the outer 14. Similar situations exist where the one electrode 13 is required to make connection at a point remote from the axis of the other 14.

The electrode 14 is the more conventional type, rod-like in form and adapted through an extension shank 16 and hand-grip 17 for direct manual application to spots on the exterior of the work at which it is desired to weld. The constructions and forms and even the functions of these parts may be varied to considerable extent in accordance with the variations in the work and the degrees of initial pressure to be applied.

The primary 11 is energized from a source of power 18 connected with the transformer through a line switch 19 over a circuit designated generally 20 throughout the diagram. This circuit 20 is opened and closed by the instantaneous time switch apparatus, the principal elements of which are the relatively high speed commutator 21, the relatively low speed commutator 22 and the welding circuit enabling apparatus designated generally 23. The welding circuit 20 includes fixed and adjustable contact brushes 24, 25 associated with contact 26 on the high speed commutator 21 connectible in series with brushes 27 and 28 cooperating respectively with segments 29 and 30 on the low speed commutator, by means of enabling circuit breaker contact 31.

The high speed commutator 21 is driven by a variable speed electric motor 32 capable of very high speed through the diagrammatically illustrated shaft 33, the speed of the motor 32 being variable by a rheostat 34. The segment 26 carried by commutator 21, the main body of which 35 is of insulating material, is of varying peripheral extent being peripherally long at one extremity and peripherally short at the other, tapering substantially uniformly from one end to the other. Its one edge 36 is parallel to the axis of the commutator while its other edge 37 is oblique thereto. Segment 26 is permanently connected with the continuous peripheral conducting ring 38 to which fixed brush 24 continuously supplies the primary potential. The relatively movable brush 25 is movable along an axially extending screw 39 axially fixed in position, but rotatable to axially adjust brush 25 by a crank 40 or equivalent means whereby the brush 25 may be adjusted axially of the commutator 21 to co-act with any axial portion of segment 26 and thereby vary the peripheral extent of contact between itself and segment 26. The time of closure of circuit 20 is by this means adjustable through a wide range of instantaneous time intervals. With the motor 32 capable of say 3600 R. P. M. and having a speed variable to any desired extent through rheostat 34 or its equivalent, the time of closure of the primary circuit at high speed rotary contacts 24, 25, 26 may be varied with extreme fineness over an extremely wide range of extremely high speeds.

Relatively low speed commutator 22 is commensurately geared to shaft 33 through reduction gearing 41 connected with a shaft 42 on which commutator 22 is mounted. This commutator bears four rotary contacts, the one 29 already mentioned as in the welding circuit 20 and angularly continuous, another 30 likewise in the welding circuit 20 having an arc slightly greater than the value commensurate with the greatest arc of segment 26 short of a complete circuit, greater specifically by a peripheral extent designated a, a third contact 43 extending over the entire periphery of the commutator 22 excepting through the major portion of the angle of extent of the segment 30, and a fourth 44 of an extent generally similar in angular location and degree to that of the segment 30. All four of these segments are commonly connected together through the common connecting conductor 45. More specifically the ratio between the arc of angular extent b of segment 30 and the arc of maximum extent c of segment 26 on commutator 21 is substantially equal to the ratio of the reduction of gears 41. Further, commutators 21 and 22 are commensurately geared together and the gears 41 in such mesh that whenever brushes 25 and 28 contact respectively with the arcs b and c of the segments 30 and 26, the making of such contact and its breaking will occur substantially at the same time. On the part of contact 30, however, the arc b occupying this synchronized and commensurate relation to the arc c, is slightly added to at both ends whereby brush 28 makes contact slightly ahead of the brush 25 and segment 26 and breaks contact slightly after the brush 25 and segment 26.

The contact 31 of the enabling apparatus 23 is normally open, the electro-magnet 46 is provided for closing it and thereby enabling the welding circuit 20. The circuit of electro-magnet 46 is designated generally 47. It is made from a push button 48 which derives its potential from a brush 47a which coacts with the segment 43 of commutator 22. Circuit 47 so made extends through the normally closed contact 48a of a relay 49 of the enabling apparatus 23, a function of which is to open and hold open circuit 47 at contact 48a so long as push button 48 is held down. Relay 49 is initially energized over circuit 50 from a make contact 51 on the electro-magnet 46. Being energized it locks itself up over circuit 52 made by its own locking contact 53 and extending through a normally open back contact 54 associated with the push button 48. But simultaneously with the energization of its lockout relay 49 enabling electro-magnet 46 closes two locking circuits, the one 55 from its contact 56 by way of circuit 47 to segment 43 and the other 57 by its contact 58 to the circuit 20 emanating from segment 30 and constituting a part of the primary welding control circuit 20.

The segment 44 controls through an angularly adjustable brush 59 the circuit 60 of an electromagnetic hammer actuator 61 associated with the hammer type electrode 14. A coil 61 of this actuator acts on a core 62 slidably mounted on the shank 16 of the electrode 14 and normally held retracted by a coil spring 63, and is adapted upon energization to suddenly throw hammer 62 forwardly into hammer blow impact with the rear end of the electrode 14. Upon de-energization the magnetic core 62 is retracted by spring 63.

The operation is as follows: To spot weld the work 15, the system is closed to the source of power 18 at switch 19. Crank 40 is turned to rotate screw 39 and adjust brush 25 axially to define the time adjudged suitable for the work in hand. Transformer voltage regulator 64 is adjusted to vary the turns ratio of the transformer and therefore the voltage of the secondary 12 for the current application desired. Through the switch 65 motor 32 of the commutators 21, 22 is started. Its revolutions are adjusted to the value properly correlated with the time as set by the brush 25, let us now say, to full speed. Thereupon the electrodes 13 and 14 are adjusted manually to opposite sides of the work, one from the interior and the other from the exterior and appropriate initial pressure is applied through bearing on the hand-grip 17 manually or otherwise. Thereupon push button 48 is closed with the following sequence of operation. Circuit 47 is closed at contact 48a from a source of power 18 via that branch of circuit 20 connected with contact 27 and segment 29 of commutator 22, interconnecting conductor 45, segment 43 when or as soon as it contacts with brush 47a, contact 48, contact 48a, electro-magnet 46 and by way of conductor 66 back to the source. Electro-magnet 46 pulls up and then closes up the following circuits: It closes circuit 50 of control lockout relay 49 at its contact 51 from conductor 29 connected with one side of the source through the coil of relay 49 and by a conductor 66 to the other side of the source. The pulling up of relay 49 opens the energizing circuit 47 of electromagnet 46. However, electro-magnet 46 has simultaneously with its closure of circuit 50 of relay 49 closed its locking contacts 56 and 58 thereby first locking itself up over circuit 55 to segment 43 and second parallelly locking itself up over circuit 57 to circuit 20 at its connection with brush 28 and segment 30. Both of these locking circuits are connected with the line through that branch of circuit 20 associated with brush 27 and segment 29, through the interconnection 45, and therefore electro-magnet 46 remains up during the combined total angular movement of segments 43 and 30. Simultaneously electro-magnet 46 closes at its next contact 67 the circuit 60 of the magnetic actuator 61 for the hammer blow electrode 14, from the line connected segment 29, conductor 45, segment 44, brush 59, through the actuating coil 61 to the other side of the line 66. And lastly, electromagnet 46 closes its contacts 31 and thereby enables the welding circuit for a welding operation. Co-ordinately as brushes 59 and 28 respectively engage segments 44 and 30 electro-magnet 61 of the hammer blow electrode 14 and primary 11 of transformer 10 are energized to the ends of passing welding current between electrodes 13 and 14 through the work 15, and striking a hammer blow of electrode 14 upon the work through the impact of the core 62 of the actuator 61 upon it. The relations and timings of the parts are such that welding current and the hammer blow may occur precisely at the proper relative moment.

When the weld has been thus made segment 30 passes from beneath brush 28 and the locking circuit 57 of electro-magnet 46 is broken, opening circuit 39 at contact 31. Inasmuch as the initial energizing circuit 47 is open at contact 48a as long as relay 49 is energized, the circuit 20 is disabled the moment segment 30 passes from beneath brush 28 and may not again be enabled until manual control contact 48 is released and unlocks relay 49 at its back contact 54. After this is done the contact 48 may again be made for a repeat operation. No matter how many revolutions commutator 21 may make or how many commutator 22 may make, but one weld can be made per actuation of the main control 48 or per actuation of electro-magnet 46 and its lock-out relay 49, therefore but one spot weld may be made per operation of the welding circuit enabling apparatus 23.

The relative angles covered by segments 43 and 30 are such that brush 47a does not contact with segment 43 during the principal portion of the dwell of brush 28 on segment 30. Thereby it is impossible to energize electro-magnet 46 during the simultaneous contact of brushes 25 and 28 respectively with segments 26 and 30. This means that a weld cannot be initiated in such relation to the primary high speed timing contacts 25, 26 as to foreshorten the adjusted period. However, as has been noted segment 30 is extended beyond the arc b commensurate and synchronized with the arc c of segment 26 by an angle a and furthermore to overlap by an arc d the trailing end of segment 43. The overlapping angle d insures effective transfer of the lockup of electro-magnet 46 from the initial locking circuit 47 to the welding circuit lockup 57. The angle a over the welding arc b insures adequate time for electro-magnet 46 to operate fully before the brush 28 commences to traverse the commensurate and synchronized arc b, which travel is precisely within the maximum time of the weld as determined by the arc c. At the leaving end of the segment 30 as respects brush 28 there is an angle e of commutator revolution in which neither brush 28 nor brush 47a contacts with a segment. This allows for a complete break of circuit 20 at the leaving end of contact 30 and a complete restoration of electro-magnet 46 before brush 47a engages again with segment 43 whereby a welding period once made may not be unduly prolonged through succeeding energization of electro-magnet 46. A further safe-guard against this is the clean high-speed break of circuit 20 at the rectilinear leaving edge 36 of the high-speed timing contact 26. Indeed the initial opening of circuit 20 may be altogether achieved at the rectilinear axial leaving edge 36 of the high-speed contact 37, or by this edge 36 in conjunction with the leaving end of segment 30. If the conjunctive action be not desired, then the leaving end of segment 30 may be extended somewhat beyond its commensurate position as defined by the arc b and the idle arc e extended accordingly. When times are adjusted by movement of brush 25 to be measured by arcs of segment 26 less than the full arc c, brush 25 makes contact with segment 26 behind the commensurate position of brush 28 at the inception of arc b, but this is of no moment since it but prolongs the period defined by arc a in which the electro-magnet 46 and its lock-out 49 may come fully into action.

The segment 44 while generally co-extensive with the segment 30 may have its ends terminate one side or the other of the ends of segment 30. The important thing is that brush 59 is angularly adjustable whereby to accurately time the relation of closure of circuit 60 of the hammer blow actuator 61 as respects the closure of the welding circuit 20 at the ultimate control contacts 25, 26. This adjustment is effected by the mechanism 68, shown in diagram as a screw and nut mechanism, and the extent of segment 44 and the extent of movement of the brush 59 is intended to be such that the adjustment will bring about a most efficient timing between the hammer blow of electrode 14 and the application of the welding current over the circuit 20.

Summing up, it will be seen that there has been achieved a method and system by means of which indirect instantaneous welding may be done, by means of which the pressures for such welding may be derived by impact and sustained after the impact with the degree determined by the relative inertias of the parts of the welding apparatus, for the inertias of the anvil 13 and of the hammer blow apparatus is such that the necessary pressures may be attained and sustained for the necessary extremely short periods of the instantaneous weld. Nevertheless the timing of both the welding pressure and the welding current are determined with utmost accuracy without influence from either mechanical or electrical inertia and without lost motions, for there is continuous rotation of the commutators 21, 22 and the time period through the adjustment of brush 25 when entered upon is free from encroachment from any of these factors. The breaking of the welding circuit is at extremely high speed, and snappy and sharp, as brush 25 passes off the edge 37 of segment 26. The time intervals measured may be extremely fine, even so small as from 1/1000 to 1/10,000 seconds and of course in any value of longer intervals. Yet the operation of the manually controlled and enabling apparatus through the low speed commutator not only gives ample time for manual manipulation and for full and electro-magnetic response of the relays 46 and 49 without false operations, but also constitutes an effective unit spot control under which but one weld can be made for one manual manipulation of the manually controlled contact 48.

The features of my inventive concept herein explained but not herein claimed, comprise subject matter of a copending application.

I contemplate the use of all equivalent electrical means in carrying out the generic spirit of my invention and particularly do I contemplate utilizing each and all electric circuit and contact expedients which may be had in attaining and maintaining in good order the electrical and mechanical action and reaction.

The terminology I have used is the best now known to me, even as the embodiment of the invention I have disclosed is the best now known to me. In order to protect those other embodiments to which the development of the art unavoidably extends the generic spirit of my invention, and their modifications likewise incorporating the generic spirit, the terminology should be given commensurate breadth independent of the present circumstances which determine it.

What I claim as new and useful and desire to protect by Letters Patent is:

1. A timing system for electric circuits comprising a continuously rotating circuit closing switch having an adjustable period of circuit closure, said switch comprising a commutator, the movable and fixed parts of which are in continuous engagement, an enabling device to cut said switch into and out of circuit closing and opening action, and means limiting the enabling action of said enabling device to a single circuit closing operation of said continuously rotating switch for each single operation of said enabling device.

2. A timing system for electric circuits comprising a high speed continuously rotating circuit control switch operating to control a circuit through continuously rotating contacts, said switch comprising a commutator, the movable and fixed parts of which are in continuous engagement, an enabling device for cutting into and out of circuit closing and opening action, said high speed continuously rotating switching apparatus and having control of the effectiveness of said switching apparatus, and means limiting the enablement of said switching apparatus by said enabling device to a single effective control of the circuit through its continuously rotating contacts for a single operation of the enabling device.

3. A timing system for electric welding circuits comprising a switching apparatus embodying high speed and relatively low speed continuously rotating welding circuit closing contacts commensurately driven together and proportioned in contact extent and proportioned commensurately to the relative speeds, said contacts being relatively movable and comprising commutators, the fixed and movable parts of which are in continuous engagement, and an auxiliary control circuit controlling the effectiveness of said switching apparatus upon a welding circuit operating through the low speed switching contact.

4. A timing system for electric welding machines comprising continuously rotating high speed and low speed commutators commensurately geared together and having joint control over a welding circuit, which circuit passes through said commutators in series, said commutator having relatively fixed and movable parts which are in continuous engagement, and an auxiliary control circuit for the commutators operating to exercise the control through the low speed commutator.

5. A timing system for electric welding machines comprising continuously rotating high speed and low speed commutators commensurately geared together and having joint control over a welding circuit, and control enabling means for the high speed commutator operating to exercise the control through the low speed commutator, which enabling means comprises a relay switch connecting the commutators in series, and a circuit controlling means for the relay adapted to close its circuit through the slow speed commutator and having a single effective circuit closing operation per cycle of its own operation.

6. A timing system for electric welding machines comprising continuously rotating high speed and low speed commutators commensurately geared together and having joint control over a welding circuit, a control enabling relay for cutting into and out of circuit closing and opening action the high speed commutator and operating to exercise the control through the low speed commutator, switching contacts on the low speed commutator and separate therefrom controlling the circuit of said relay in series and out of step with the welding circuit control contacts, and dual locking circuits for said relay, one extending through the relay enabling contact of the commutator and the other through the welding circuit control contact thereof.

7. A timing system for electric welding machines comprising continuously rotating circuit controlling commutators, one rotating at extremely high speed and having contacts at which the welding circuit is broken, and the other commensurately geared together and in series therewith rotating at relatively low speed and controlling the completion of the welding circuit through the high speed commutator, said commutators having their fixed and movable parts in continuous engagement and a welding circuit including said series of high speed and low speed contacts.

8. A timing system for electric welding machines comprising continuously rotating circuit controlling commutators, one rotating at extremely high speed and having contacts at which the welding circuit is broken, and the other commensurately geared in series therewith rotating at relatively low speed and controlling the completion of the welding circuit through the high speed commutator together with means to vary the period of closure of the circuit, and a welding circuit including said high speed and low speed contacts.

9. A timing system for electric spot welding circuits comprising a switching apparatus embodying high speed and relatively low speed continuously rotating welding circuit energizing contacts, said contacts being commensurately driven and proportioned commensurately in contact extent and to the relative speeds, said contacts being relatively movable and comprising commutators having their fixed and movable parts in continuous engagement, and an auxiliary control circuit controlling the effectiveness of said switching apparatus upon a welding circuit operating through the low speed switching contact, and means for adjustably varying the effective period of closure of said high speed contacts within pre-determined maximum limits.

10. A timing system for electric spot welding circuits comprising a switching apparatus embodying high speed and relatively low speed continuously relatively rotating welding circuit energizing contacts proportioned in contact extent and commensurately driven, said contacts being relatively movable and comprising commutators having their fixed and movable parts in continuous engagement, and an auxiliary control circuit controlling the effectiveness of said switching apparatus upon a welding circuit operating through the low speed switching contact, and means adjustable to provide variable speeds of said contacts without affecting said synchronous relation therebetween.

11. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising a plurality of continuously driven high speed and low speed relatively movable switching elements synchronously relatively movable with respect to each other.

12. A timing system for electric welding circuits comprising a switching apparatus embodying high speed and relatively low speed continuously relatively rotating welding circuit energizing contacts proportioned in contact extent and commensurately driven, said contacts being relatively movable and comprising commutators having fixed and movable parts in continuous engagement, reducing gearing interposed between said high and low speed contacts, and an auxiliary control circuit controlling the effectiveness of said switching apparatus upon a welding circuit operating through the low speed switching contact.

13. A timing system for electric welding circuits comprising a switching apparatus embodying high speed and relatively low speed continuously rotating welding circuit closing contacts proportioned in contact extent and commensurately driven, a circuit passing through said contacts in series relation, an auxiliary control circuit controlling the effectiveness of said switching apparatus upon a welding circuit operating through the low speed switching contact, and means whereby said low speed contacts close and open a portion of said welding circuit respectively before and after the closure and opening of the high speed contacts in said circuit.

14. In an electric spot welding apparatus including a pair of electrodes arranged to be brought into contact with work, an electric circuit for supplying the electrodes with energy periodically fluctuating to and from zero, the combination of means for operatively energizing said circuit and for automatically maintaining said circuit energized for a definite period of time and then effectively de-energizing said circuit, said means including high and low speed relatively movable contacts synchronously movable with respect to each other, means for initiating the operation of said means, and means for preventing more than a single energization of said circuit to welding strength for each actuation of said initiating means.

15. A timing system for electric welding machines comprising a continuously rotating circuit closing switch having an adjustable period of circuit closure, an auxiliary control circuit having relatively movable contacts in series circuit relation to said switch to cut said switch into and out of circuit closing and opening action, and electrical means limiting the enabling action of said enabling device to a single circuit closing operation of said continuously rotating switch for each single operation of said enabling device.

16. A timing system for electric welding circuits comprising a switching apparatus embodying high speed and relatively low speed continuously rotating welding circuit closing contacts proportioned in contact extent and commensurately driven, enabling means controlling the effectiveness of said switching apparatus upon a welding circuit operating through the low speed switching contact, and electrical relay means operating by circuits through said circuit closing contacts and arranged to prevent operation of said enabling means at a time when the high speed contacts are in engagement.

17. A timing system for electric welding machines comprising continuously rotating high speed and low speed relatively movable contacts commensurately geared together and having joint control over a welding circuit, a control enabling means including a relay for cutting into and out of effective circuit closing and opening action said relatively movable contacts and operating to exercise the control through the low speed contacts, switching contacts synchronously operated in relation to the relatively movable contacts and arranged to control the operation of said enabling means in series with and out of step with the welding circuit control contacts, and means arranged to provide dual locking circuits for said relay, one of said circuits extending through a relay enabling contact of said relatively movable contacts and the other through a welding circuit control contact of said relatively movable contacts.

18. A timing system for electric welding machines comprising a continuously rotating welding circuit control switch operating to control a welding circuit through a plurality of continuously rotating contacts continuously operated to make and break contact, an enabling device for cutting into and out of circuit closing and opening action said high speed continuously rotating switching apparatus and having control of the effectiveness of said switching apparatus, and means operating through said continuously rotating contacts limiting the enablement of said switching apparatus by said enabling device to a single effective control of a welding circuit through its continuously rotating contacts for a single operation of the enabling device.

19. A timing system for electric circuits comprising a plurality of relatively movable contacts synchronously driven with respect to each other and continuously operated to make and break contact, a circuit arranged to be energized for an adjustable definite timed period through said contacts, an enabling device arranged to cut said contacts into and out of effective circuit closing and opening action, means to initiate the operation of said enabling device, and means including a locking relay, jointly operating through said circuit timing contacts and through said initiating means, whereby to limit the enabling action of said enabling device to a single effective circuit closing operation of said circuit contacts for each single operation of the initiating means.

20. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising a plurality of continuously driven relatively high speed and low speed relatively movable switching elements synchronously relatively movable with respect to each other, said system arranged so that the circuit opening action always occurs at the high speed relatively movable contacts.

21. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising a plurality of continuously driven high speed and low speed relatively movable switching elements synchronously relatively movable with respect to each other, and means for adjusting the period of closure of said relatively movable switching elements, said system arranged so that the circuit opening action always occurs at the high speed relatively movable contacts.

22. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising a plurality of continuously driven high speed and low speed relatively movable switching elements synchronously relatively movable with respect to each other, and means arranged to prevent a foreshortening of said pre-set time period of circuit closure.

23. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising a plurality of continuously driven high speed and low speed relatively movable switching elements synchronously relatively movable with respect to each other, and means arranged to prevent a foreshortening of said pre-set time period of circuit closure, said means including a lock out relay.

24. A timing system for electric spot welding machines comprising a continuously rotating circuit closing switch having an adjustable period of circuit closure, an enabling device to cut said switch into and out of circuit closing and opening action, and means limiting the enabling action of said enabling device to a single effective circuit closing operation of said continuously rotating switch for each single operation of said enabling device, said switch comprising continuously driven relatively movable switching elements, relatively movable synchronously with respect to each other, and means operating through said relatively movable switching elements to prevent a foreshortening of the timed welding period of said system.

JOHN P. TARBOX.